United States Patent [19]

Bompard et al.

[11] Patent Number: 5,014,755
[45] Date of Patent: May 14, 1991

[54] TEXTILE STRUCTURE WITH BINDING WEAVE FOR MULTIPLE LAYERS OF NON-INTERLACED FIT FILAMENTS

[75] Inventors: Bruno Bompard, Lyons; Jean Aucagne, La Tour du Pin, both of France

[73] Assignee: Brochier S.A., Decines, France

[21] Appl. No.: 231,209

[22] Filed: Aug. 11, 1988

[30] Foreign Application Priority Data

Aug. 11, 1987 [FR] France .................. 87 11429

[51] Int. Cl.⁵ .................................. D03D 15/00
[52] U.S. Cl. .................. 139/420 A; 139/383 R; 428/109; 428/111; 428/295; 428/373; 428/902
[58] Field of Search ........... 139/420 R, 424 A, 383 R; 428/902, 373, 107, 109, 110, 111, 114, 294, 295, 408, 260, 395

[56] References Cited

U.S. PATENT DOCUMENTS

| | | | |
|---|---|---|---|
| 3,819,461 | 6/1974 | Saffadi | 428/902 X |
| 3,997,697 | 12/1976 | Brochier | 428/902 X |
| 4,092,453 | 5/1978 | Jonda | 139/420 R X |
| 4,107,371 | 8/1978 | Dean | 139/420 R X |
| 4,320,160 | 3/1982 | Nishimura et al. | |
| 4,460,633 | 7/1984 | Kobayashi et al. | 428/902 X |
| 4,614,678 | 9/1986 | Ganga | 428/373 |
| 4,748,996 | 6/1988 | Combier | 428/111 X |
| 4,770,915 | 9/1988 | Nakagawa et al. | 428/373 X |
| 4,772,502 | 9/1988 | Okora et al. | 428/373 X |

FOREIGN PATENT DOCUMENTS

| | | |
|---|---|---|
| 1394271 | 2/1965 | France . |
| 2220610 | 10/1974 | France . |
| 2568275 | 1/1986 | France . |
| 59-192768 | 1/1984 | Japan ...... 428/260 |
| 2093768 | 9/1982 | United Kingdom . |

Primary Examiner—Andrew M. Falik
Attorney, Agent, or Firm—Wenderoth, Lind & Ponack

[57] ABSTRACT

Textile structure based on filaments impregnated and/or coated with thermoplastic material (FIT filaments) is formed from at least two layers of such FIT filaments, arranged perpendicularly to one another in the manner of a warp and a weft, but without being interlaced, and a binding weave consisting of a warp and a weft holding each of the FIT filaments in position. The textile structure is particularly applicable to the production of laminates exhibiting high mechanical stength.

13 Claims, 1 Drawing Sheet

TEXTILE STRUCTURE WITH BINDING WEAVE FOR MULTIPLE LAYERS OF NON-INTERLACED FIT FILAMENTS

FIELD OF THE INVENTION

The invention relates to textile structures, particularly those used in the fabrication of laminated articles of the type employed in composite materials.

PRIOR ART

It is known to use textile structures comprising filaments or fibers of a thermoplastic material, in order to produce laminates by stacking such individual structures and then placing the stack in a mold and subjecting the same to heat and pressure sufficient to cause a composite material to be formed, in which thermoplastic resin is reinforced by the textile structure. UK-A-2,093,768 is illustrative of this field of technology.

Textile filaments consisting of a core or reinforcement capable of exhibiting excellent physical and mechanical properties, and of an impregnated or coated thermoplastic covering have recently been developed. Such filaments, which are known, for example, in the field as FIT (Fiber Impregnated with Thermoplastics), are of great interest for producing textile structure suitable for the manufacture of laminates. By virtue of their construction, such filaments contribute the required quantity of thermoplastic resin, thus enabling a more homogeneous material to be finally produced.

However, due to their nature, such filaments have a relatively large diameter, because of the combination of the impregnating and/or coating resin and the filament core. A person skilled in the art knows that woven structures made from filaments of the FIT type cannot have a planar configuration; on the contrary, such fabrics have an undulated appearance, and this ultimately results in imperfections when the laminates are manufactured under the action of heat and pressure. In fact, when the thermoplastic resin melts, the cores of the filaments (or reinforcing fibers) are entrained by the matrix and move when pressure is applied to produce the laminate. Thus, when fabrics comprising filaments of the FIT type are used in manufacturing traditional weaves such as taffeta, serge, satin and others, laminates which exhibit mediocre mechanical properties are obtained.

SUMMARY OF THE INVENTION

The object of the invention is to provide a new textile structure based on filaments impregnated and/or coated with thermoplastic material which allow laminates exhibiting improved mechanical properties to be produced. The above object of the invention is achieved by providing a textile structure based on filaments impregnated and/or coated with thermoplastic material, the structure comprising at least two layers of such filaments, arranged perpendicularly to one another in the manner of a warp and a weft, but without being interlaced, and a binding weave consisting of a warp and a weft holding each of the filaments in position.

One of the essential features of the new textile structure is the binding weave employed. The weave can be disposed in any manner whatsoever in the structure that binds together the filaments which are impregnated and/or coated with thermoplastic materials. Thus, the weave may include a warp and a weft which are conventional, the weft consisting of parallel filaments and the warp of a series of filaments which are parallel to each other, oriented perpendicularly to the weft filaments and passing alternately over each of them, thereby enclosing the reinforcing filaments. Alternative forms of a binding weave can also be employed. For example, variable degrees of suppleness can be imparted to the textile structure, while suitably holding the reinforcing filaments, by employing warp filaments which, after having enclosed a reinforcing filament, do not pass over the weft filament and the reinforcing filament which are immediately adjacent but jump over the latter, or over a group of the latter, and then pass over a weft filament and a reinforcing filament which follow. Examples of such weaving patterns which are themselves known to a person skilled in the art, will be discussed below.

BRIEF DESCRIPTION OF THE DRAWINGS

The invention will be illustrated further, without being limited in any manner, by the description which follows with reference to the attached drawings, in which.

DETAILED DESCRIPTION OF THE PREFERRED EMBODIMENTS

Figure 1:
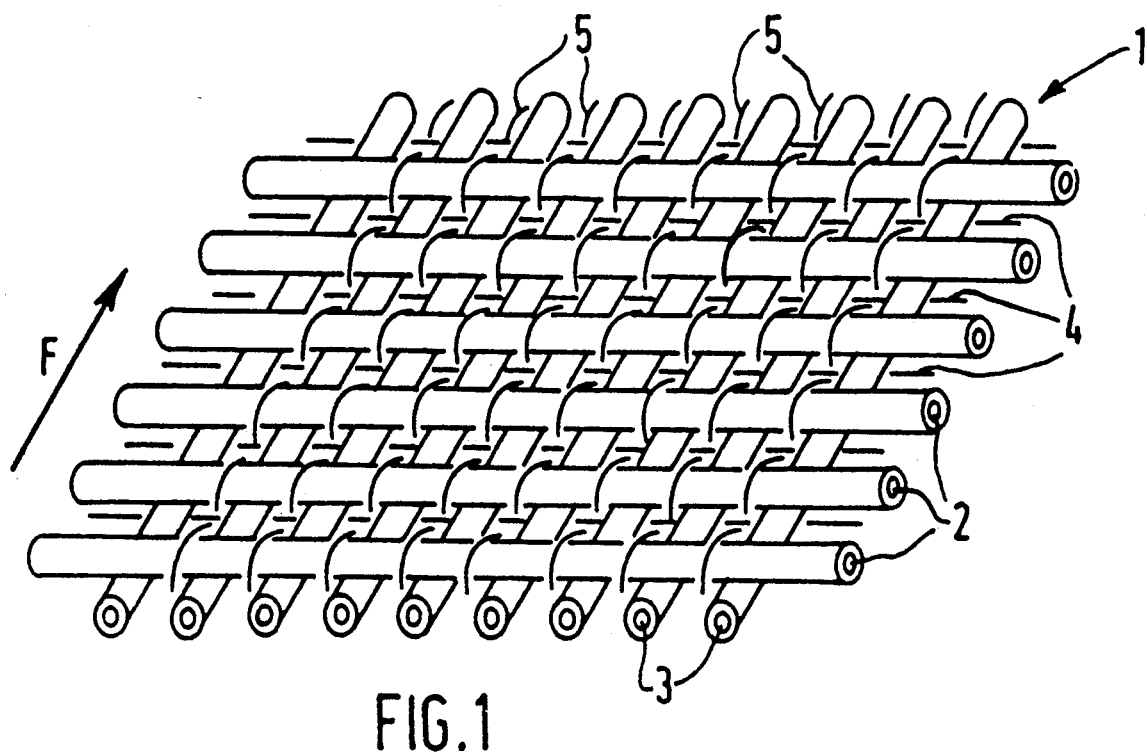
FIG. 1 is a perspective view of textile structure according to the invention.
Figure 5:
FIG. 5 shows diagrammatically and on an enlarged scale a reinforcing filament employed in the textile structure according to the invention.

FIG. 1 is a perspective view of textile structure according to the invention. In the example shown, the structure comprises two layers made up, respectively, of reinforcing filaments (2,3) extending parallel to each other in each of the layers and with the orientation of the layers arranged perpendicularly to each other. These reinforcing filaments have a structure like that illustrated in FIG. 5, that is to say they consist of a core (6) impregnated and/or coated with a covering or sheet (7) of thermoplastic material. It will be noted that, according to the feature characterizing the structure of the invention, the filaments (2) are not interlaced with the filaments (3), the arrangement being produced without contraction. Examples of filaments (2,3) of their cores and of the thermoplastic material which surrounds them have already been indicated earlier. For convenience, the discussion will now concern FIT type filaments.

Figure 2:
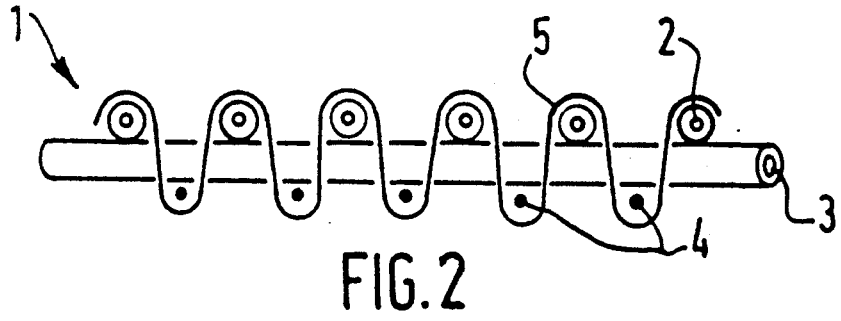
FIG. 2 is a partial sectional view of the structure of FIG. 1, as taken in the warp direction thereof (arrow F in FIG. 1)
Figure 3:
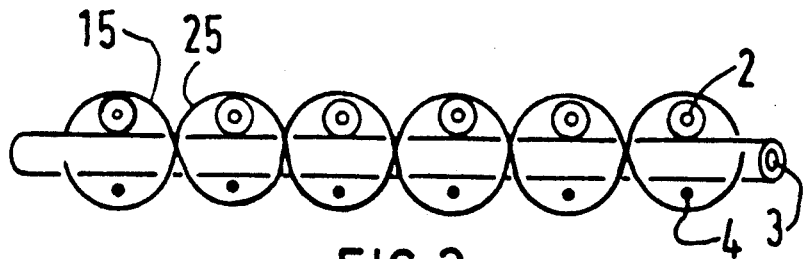
FIG. 3 is a sectional view similar to FIG. 2, showing an alternative embodiment of the textile structure.
Figure 4:
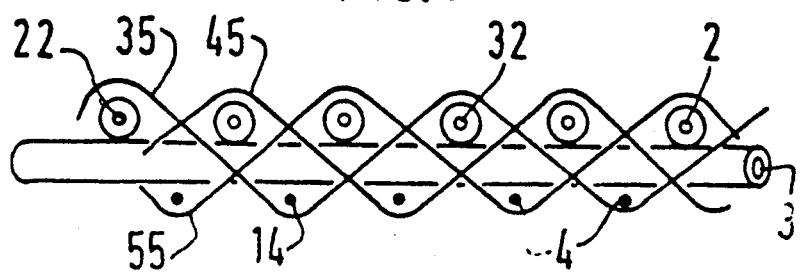
FIG. 4 is a sectional view similar to FIGS. 2 and 3 and illustrating another embodiment.

According to the essential feature of the invention, the two unidirectional layers of FIT type filaments (2,3) are bound by a binding weave comprising a weft consisting of parallel filaments (4), and a warp consisting of filaments (5) which extend parallel to each other, are oriented perpendicularly to the weft and each pass, as illustrated in FIGS. 2-4, respectively alternately over a weft filament (4) and only one FIT filament (2) in one (the upper in the figures) of two adjacent layers of the FIT filaments, the general arrangement being that illustrated in FIG. 1.

Any reinforcing filament or fiber usually employed in textile structures of this kind can be employed in the textile structure according to the invention. These therefore include carbon, glass, aramid, silicon carbide or ceramic fibers and other fibers known to exhibit good physical and/or mechanical properties.

As mentioned above, the invention employs filaments or fibers which are impregnated and/or coated with a covering or sheath of thermoplastic material. The latter may be chosen from any thermoplastic resin capable of being employed in an application of this kind, such as, for example, polyolefins, polyamides, polyesters, polyphenylsulfones (PPS), polyethersulfones (PES), polyetherimides (PEI), polyetheretherketones (PEEK) and other similar materials possessing thermoplastic properties and capable of impregnating or coating the above-mentioned filaments or fibers. For example, good results have been obtained by employing polyamide-covered carbon or aramid filaments.

Filaments of this kind are known to a person skilled in the art, particularly by the name of FIT filaments, and can be obtained in practice by means which are also known, for example by coating a core with a thermoplastic sheath.

According to the invention, the textile structure comprises at least two layers of such filaments, the layers being arranged in the form of two unidirectional sheets oriented perpendicularly to one another, the filaments of one layer not being interlaced with the filaments of the other.

The layers are held by a binding weave consisting of a warp and a weft, whose essential function is that of binding the layers. A wide variety of yarns, fibers or filaments can therefore be employed for this binding warp and weft, which may be made, for example, of glass, polyester or, most advantageously, mono- or multi-filaments having the same chemical nature as that of the sheath or core of the filaments of which the above-mentioned layers are made. In practice, the best results have been obtained with a binding weave consisting of glass fiber filaments.

The technique of employing an additional binding filament to join two sheets integrally is known, for example for binding filaments of high-modulus glass but, so far as Applicants are aware, a binding weave has never been applied in a textile structure comprising non-interlaced layers formed of the TIF filaments impregnated and/or coated with thermoplastic material. The invention makes it possible to hold the reinforcing fibers during the molding process under pressure when laminates and composite materials incorporating them are produced. In such laminates, a certain number of unit textile structures defined above, in the form of "plies", are superposed along directions which can vary between the plies. In an application of this kind, that is to say in the manufacture of laminates for which the present invention is especially designed, it has been found that the use of the above-mentioned textile structure offered a certain number of improvements in comparison with a single unidirectional fabric made in a conventional manner from filaments of the FIT type:

the mechanical properties (shear stress, flexural stress, flexural modulus) are all superior;

superior characteristics are obtained in the laminates comprising a number of plies which is smaller than that necessary to comprise a unidirectional fabric;

when the laminate is manufactured, lower pressures than those required to fabricate unidirectional fabric can be employed to obtain the same thickness of material;

the proportion of fibers by volume (pfv), which is a conventional parameter for characterizing laminated composite materials, is higher in the textile structures according to the invention, or is obtained more quickly with the same molding pressure;

the porosity of the composite material obtained according to the invention is very low, in correlation with the proportion of fibers by volume; it does not exceed 2% and is generally virtually zero.

It can be seen, therefore, that the textile structures of the invention offer many advantages in the production of laminated composite materials.

FIGS. 3 and 4 illustrate other embodiments of the invention. In each of these embodiments, the filaments of the warp collectively encircle the filaments of the weft and the FIT filaments of one (the upper layer in the figures) of two adjacent layers of the FIT filaments, as viewed in the direction of the weft. In FIG. 3, the binding weave still comprises weft filaments (4), but it has warp filaments (15, 25) arranged as illustrated in the drawing, enclosing a filament (2) and a weft filament (4). More particularly, in FIG. 3, each of the filaments (15, 25) of the warp passes alternately over only one of each two adjacent filaments (4) of the weft and only one of each two adjacent FIT filaments of one (the upper) of the adjacent layers thereof.

FIG. 4 shows another form of the binding weave with weft filaments (4) and warp filaments (35, 45, 55). A warp filament such as (35) passes over a first reinforcing filament (22), then over a weft filament (14) and next over a reinforcing filament (32) offset by three filaments in the layer of filaments (2). In other words, each of the filaments (35, 45) of the warp passes alternately over one of a group of at least three adjacent filaments (4) and only one of at least three adjacent FIT filaments in one of two adjacent layers thereof. The same weave is applied to the binding weave warp filaments (45 and 55) respectively.

The structures shown in FIGS. 3 and 4 illustrate, by way of simple examples, possible weaves which can impart more suppleness to the textile structure, while holding the reinforcing filaments (2, 3) in their respective places as in the structure illustrated in FIGS. 1 and 2.

It goes without saying that other forms of weaving the binding weave can be applied, albeit without departing from the scope of the invention.

A textile structure according to the invention has been woven in a manner corresponding to that shown in FIGS. 1 and 2, comprising carbon filaments of the FIT type (2, 3) coated with polyamide (nylon 12). The carbon fibers employed as the cores in the FIT type filaments are those known under the trade name Filkar, type T300/B/6K/40A.

The binding weave was made out of 34-text glass fiber weft filaments (4) and 22-tex glass fiber warp filaments (5).

It goes without saying that this is merely an example, because the invention can also be applied to the production of textile structures in which the layers of filaments (2, 3) are of different natures, for example glass-carbon, carbon-aramid, glass-aramid, carbon-silicon carbide, aramid-silicon carbide and other similar combinations. Similarly, the binding weave can be made up of different filaments chosen from glass, aramid, carbon, silicon carbide, ceramic and thermoplastic fibers such as polyamide, polyester, PES, PPS, PEI, PEEK or others.

By way of comparison, a unidirectional fabric has also been manufactured according to conventional weaving methods, by employing filaments of the FIT type possessing characteristics identical to those of the structure according to the invention.

The mechanical characteristics of the fabric according to the invention and of the conventional fabric have been measured and compared by producing test specimens, as is usual for the evaluation of technical fabrics intended for laminates, in accordance with the standards published by the Aerospatiale Company IGC 04.26.235 with respect to shear and IGC 04.26.245 with respect to flexure.

The results of these measurements are collated in Table 1.

TABLE 1

| Mechanical characteristics | Fabric according* to the invention | Conventional** fabric |
|---|---|---|
| shear stress (MPa) | 35–40 | 35 |
| flexural stress (MPa) | 300–400 | 250–300 |
| flexural modulus (MPa) | 20,000–40,000 | 15,000–20,000 |

*0°/90° crossed fabric formed by FIT type filaments carbon filament core (T300.6K) covered with polyamide (nylon 12) and binding weave made out of 34-tex glass fiber filaments as weft and 22-tex glass fiber filaments as warp
**unidirectional taffeta fabric consisting of FIT type warp filaments identical with the above-mentioned filaments and 34-tex glass fiber as warp.

Comparisons of the proportion of fibers by volume (pfv) were also made in plaques or laminates comprising an identical number of plies, each of them being produced, on the one hand, from the fabric according to the invention and, on the other hand, with the conventional fabric. In the case of the latter, at a molding pressure of 7 bars, the pfv value is close to 42%, which is unsatisfactory. Acceptable values of pfv (higher than 50%), from 50 to 60%, are obtained by increasing the pressure up to 8–10 bars. On the other hand, in the case of an identical plaque with the fabric according to the invention, 45% of pfv is obtained at a pressure of 7 bars and a value of 50 to 60% is obtained more quickly at a pressure of approximately 8 bars. Thus, the manufacturing time is comparatively less and the molding pressure lower, these factors being advantageous in the mass production of laminates.

In this connection, the porosity values, which have a certain relationship with the proportion of fibers by volume, have been compared. Under the above conditions, a porosity of 0 to 5% is obtained in the conventional fabric, and this value reaches even 8% in the case of a pfv=60%. In comparison, plaques obtained from the fabric according to the invention have a porosity not exceeding 1 to 2% and, in general, close to 0% in practice. Thus satisfactorily homogeneous laminated composite materials can be realized according to the invention.

Lastly, comparative measurements of plaque thicknesses have been carried out.

Thus, a plaque containing 11 single plies (11 layers of UD filaments) based on conventional fabric, which were oriented along the +45°, 0, −45°, 90°; +45°, 0, +45°, 90°, −45°, 0 and +45° directions respectively, was produced. The plaque obtained has an excessive thickness, which was in the order of 3 mm. A molding pressure of at least 8 to 10 bars was necessary in order to reduce this thickness.

In comparison, a plaque containing 7 lined plies (14 layers of UD filaments) made of the fabric according to the invention and oriented along the (+45°, −45°), (90°, 0°), (−45°, +45°), (0°, 90°), (+45°, −45°), (0°, 90°) and (−45°, +45°) directions respectively, was produced. The thickness obtained was only 2.5 mm with a pressure in the order of 8 bars. It can be seen, therefore, that with respect to analogous mechanical structure, it is possible to impart to the laminated material of the invention a thickness which is lower than that of the materials obtained with a conventional fabric based on FIT type filaments.

Without considering this explanation to imply any limitations on the invention, it is thought that the superior properties obtained by the invention are due to the fact that the reinforcing fibers are held perfectly in position by the binding weave and do not move within the laminated article when the molding pressure and temperature are applied.

What is claimed is:

1. Textile structure comprising at least two stacked layers of FIT filaments, each of said filaments consisting of a core or reinforcement impregnated with or having a coating of thermoplastic material so as to be of relatively large diameter, the filaments in each of said layers extending parallel to one another and the filaments of each respective one of said layers being non-interlaced with the filaments of each of the other respective said layers so that said layers of FIT filaments exhibit a planar configuration, and the filaments of each one of said layers extending in a direction perpendicular to the direction in which the filaments of another of said layers extend, and a binding weave binding said layers of FIT filaments together, said binding weave consisting of a warp and a weft of threads having a diameter smaller than the diameter of said FIT filaments, said binding weave securing said filaments in position relative to one another in a manner in which the planer configuration exhibited by said layers of FIT filaments is maintained.

2. Textile structure as claimed in claim 1, where each one of said filaments is one of a carbon, glass, aramid, silicon carbide, and ceramic filament or fiber.

3. Textile structure as claimed in claim 1 wherein said thermoplastic material is one of a polyolefin, polyamide, polyester, polyethersulfone, polyphenylsulfone, polyetherimide, and polyetheretherketone.

4. Textile structure as claimed in claim 1, wherein at least some of said filaments are polyamide-covered carbon filaments.

5. Textile structure as claimed in claim 1, wherein at least some of said filaments are polyamide-covered aramid filaments.

6. Textile structure as claimed in claim 1, wherein the warp and weft of said binding weave comprise a plurality of threads, each one of said threads being made of one of glass and polyester.

7. Textile structure as claimed in claim 1, wherein the warp and weft of said binding weave comprise a plurality of threads, each one of said threads being one of a monofilament and a multifilament having the same chemical nature as that of said core or said thermoplastic material.

8. Textile structure as claimed in claim 1, wherein the warp and weft of said binding weave consists of glass fiber filaments.

9. Textile structure as claimed in claim 1, wherein said weft consists of filaments extending parallel to one another, and said warp consists of filaments extending parallel to one another and oriented perpendicularly to the filaments of said weft, the filaments of said warp passing alternately over the filaments of said weft and the FIT filaments of one of two adjacent said layers.

10. Textile structure as claimed in claim 1, wherein said weft consists of a plurality of filaments, and said warp consists of a plurality of filaments, the filaments of said warp collectively encircling the filaments of said weft and the FIT filaments of one of two adjacent said layers as viewed in the direction of said weft.

11. Textile structure as claimed in claim 10, wherein each of the filaments of said warp passes alternately over only one of each two adjacent said filaments of said weft and only one of each two adjacent said FIT filaments of said one of two adjacent said layers.

12. Textile structure as claimed in claim 10, wherein each of the filaments of said warp passes alternately over one of a group of at least three adjacent said filaments of said weft and only one of at least three adjacent said FIT filaments of said one of two adjacent said layers.

13. Textile structure as claimed in claim 10, wherein said weft consists of filaments extending parallel to one another, and said warp consists of filaments extending parallel to one another and oriented perpendicularly to the filaments of said weft, each of the filaments of said warp passing alternately over one of the filaments of said weft and only one of each two adjacent said FIT filament of said one of two adjacent said layers.

* * * * *